(12) United States Patent
Weber

(10) Patent No.: US 11,230,869 B2
(45) Date of Patent: Jan. 25, 2022

(54) DAMPER

(71) Applicant: Druck- und Spritzgusswerk Hettich GmbH & Co. KG, Frankenberg (DE)

(72) Inventor: Konrad Weber, Ebsdorfergrund (DE)

(73) Assignee: Druck- und Spritzgusswerk Hettich GmbH & Co. KG, Frankenberg (DE)

(*) Notice: Subject to any disclaimer, the term of this patent is extended or adjusted under 35 U.S.C. 154(b) by 120 days.

(21) Appl. No.: 16/623,885

(22) PCT Filed: Jun. 22, 2018

(86) PCT No.: PCT/EP2018/066770
§ 371 (c)(1),
(2) Date: Dec. 18, 2019

(87) PCT Pub. No.: WO2019/002130
PCT Pub. Date: Jan. 3, 2019

(65) Prior Publication Data
US 2021/0148148 A1 May 20, 2021

(30) Foreign Application Priority Data
Jun. 29, 2017 (DE) .................. 10 2017 114 475.7

(51) Int. Cl.
*E05F 3/12* (2006.01)
*E05F 3/20* (2006.01)
*F16F 13/00* (2006.01)

(52) U.S. Cl.
CPC .................. *E05F 3/12* (2013.01); *E05F 3/20* (2013.01); *F16F 13/007* (2013.01);
(Continued)

(58) Field of Classification Search
CPC ......... E05F 5/10; E05F 5/02; E05Y 2201/256
See application file for complete search history.

(56) References Cited

U.S. PATENT DOCUMENTS 3,621,951 A 11/1971 Schmid
4,817,238 A * 4/1989 Liu .................. F16F 9/0218
16/58
(Continued)

FOREIGN PATENT DOCUMENTS

CN 101680254 A 4/2010
CN 102422047 A 4/2012
(Continued)

OTHER PUBLICATIONS

German Search Report dated Feb. 20, 2018 issued in corresponding German Application 10 2017 114 475.7 (with English Translation of relevant parts).
(Continued)

*Primary Examiner* — Victor D Batson
*Assistant Examiner* — Matthew J Sullivan
(74) *Attorney, Agent, or Firm* — Collard & Roe, P.C.

(57) ABSTRACT

A damper for fittings for furniture or household appliances has a housing in which a piston connected to a piston rod is guided in a linearly displaceable manner, the piston dividing an interior space in the housing into two chambers, wherein at least one flow channel is formed on or in the piston, which flow channel connects the two chambers to one another, wherein a throttle element is provided, which, in a damping position, keeps the cross-section of the at least one flow channel small when the piston moves in a first direction in order to generate high damping forces, and when the piston moves in the second direction opposite to the first direction, increases the cross-section of the at least one flow channel for reducing the damping forces by a movement of the throttle element.

12 Claims, 13 Drawing Sheets

(52) U.S. Cl.
CPC ... *E05Y 2201/234* (2013.01); *E05Y 2201/256* (2013.01); *E05Y 2201/264* (2013.01); *E05Y 2900/20* (2013.01); *E05Y 2900/30* (2013.01); *F16F 2222/12* (2013.01); *F16F 2228/066* (2013.01); *F16F 2230/0005* (2013.01); *F16F 2230/30* (2013.01); *F16F 2232/08* (2013.01); *F16F 2234/02* (2013.01)

(56) References Cited

U.S. PATENT DOCUMENTS

| | | | | |
|---|---|---|---|---|
| 6,802,408 | B2* | 10/2004 | Krammer | F16F 9/348 188/282.1 |
| 7,584,829 | B2* | 9/2009 | Schmidt | F16F 9/3484 188/280 |
| 7,845,050 | B2* | 12/2010 | Pyo | F16F 9/3405 16/85 |
| 7,966,693 | B2* | 6/2011 | Choi | E05F 3/20 16/54 |
| 8,104,140 | B2 | 1/2012 | Bassi | |
| 8,336,166 | B2* | 12/2012 | Kim | E05F 5/006 16/82 |
| 8,657,085 | B2 | 2/2014 | Ogawa | |
| 8,898,860 | B2 | 12/2014 | Bacchetti | |
| 9,353,563 | B2 | 5/2016 | Bacchetti | |
| 9,353,564 | B2 | 5/2016 | Bacchetti | |
| 9,682,605 | B2* | 6/2017 | Ankney | F16F 9/516 |
| 9,926,731 | B2 | 3/2018 | Bacchetti | |
| 10,145,441 | B2* | 12/2018 | Zhu | F16F 13/007 |
| 10,246,924 | B2* | 4/2019 | Hopkins | E05F 5/10 |
| 10,428,896 | B2* | 10/2019 | Zimmer | E05F 5/02 |
| 10,865,597 | B2* | 12/2020 | Chen | F16F 13/007 |
| 2006/0207843 | A1 | 9/2006 | Migli | |
| 2007/0251052 | A1* | 11/2007 | Pyo | E05F 5/10 16/86 A |
| 2009/0090587 | A1* | 4/2009 | Tomita | F16F 9/3214 188/282.6 |
| 2012/0118689 | A1 | 5/2012 | Ogawa | |
| 2014/0075718 | A1 | 3/2014 | Bacchetti | |
| 2015/0226284 | A1* | 8/2015 | Dora | F16F 9/5126 16/82 |

FOREIGN PATENT DOCUMENTS

| | | | |
|---|---|---|---|
| CN | 103352956 A | 10/2013 | |
| DE | 1039886 B | 9/1958 | |
| DE | 1817392 A1 | 7/1970 | |
| DE | 2714529 A1 | 10/1978 | |
| DE | 3629594 A1 | 3/1988 | |
| EP | 1703166 A1 | 9/2006 | |
| EP | 1766174 A2 | 3/2007 | |
| EP | 2006480 A1 | 12/2008 | |
| EP | 2546443 A1 | 1/2013 | |
| EP | 2546443 A1 * | 1/2013 | ............ F16F 9/348 |
| JP | 57204342 A | 12/1982 | |
| WO | 2007116273 A1 | 10/2007 | |
| WO | 2012137042 A1 | 10/2012 | |
| WO | 2012156949 A2 | 11/2012 | |
| WO | 2014013651 A1 | 1/2014 | |

OTHER PUBLICATIONS

International Search Report dated Oct. 16, 2018.
Chinese Office Action dated Jan. 20, 2021 issued in Chinese Application No. 201880040242.X (with English translation of the relevant parts).

* cited by examiner

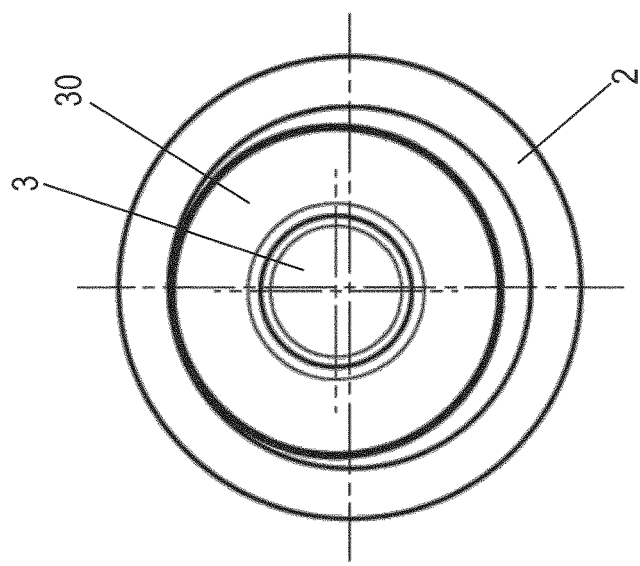
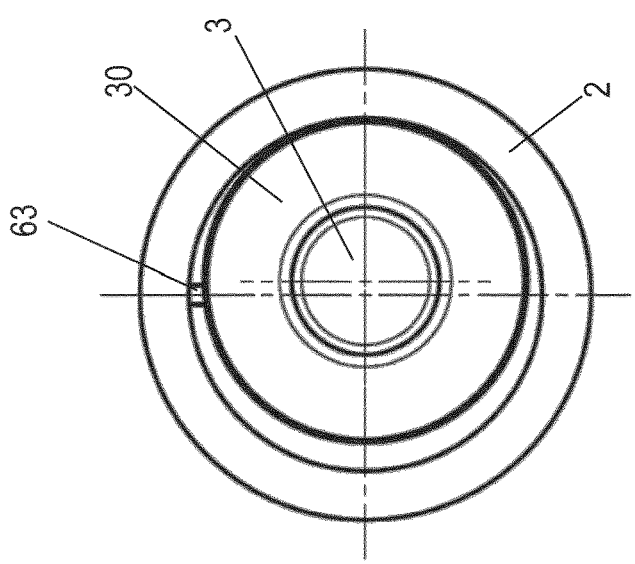
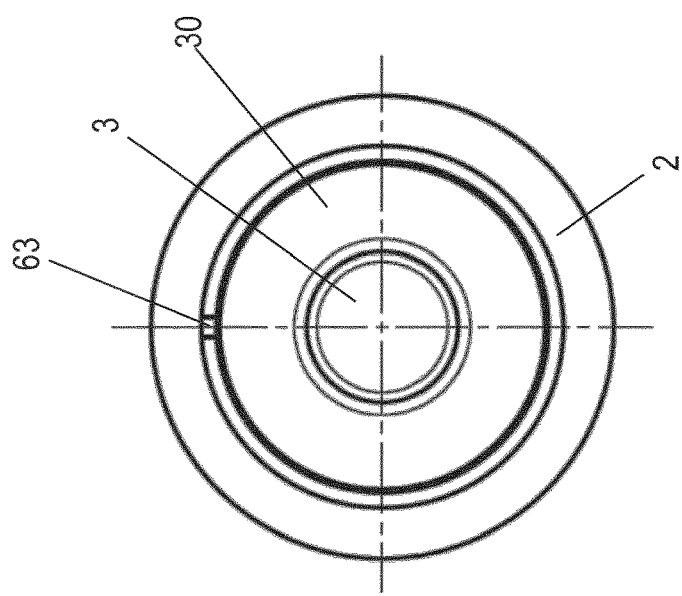

DAMPER

CROSS REFERENCE TO RELATED APPLICATIONS

This application is the National Stage of PCT/EP2018/066770 filed on Jun. 22, 2018, which claims priority under 35 U.S.C. § 119 of German Application No. 10 2017 114 475.7 filed on Jun. 29, 2017, the disclosures of which are incorporated by reference. The international application under PCT article 21(2) was not published in English.

BACKGROUND OF THE INVENTION

The present invention relates to a damper for fittings for furniture or household appliances, having a housing in which a piston connected to a piston rod is guided in a linearly displaceable manner, the piston dividing an interior space in the housing into two chambers, wherein at least one flow channel is formed on or in the piston, which flow channel connects the two chambers to one another, wherein a throttle element is provided, which, in a damping position, keeps the cross-section of the at least one flow channel small when the piston moves in a first direction in order to generate high damping forces, and when the piston moves in the second direction opposite to the first direction, increases the cross-section of the at least one flow channel for reducing the damping forces by a movement of the throttle element.

EP 2 006 480 B1 discloses a damper for furniture which comprises a damper housing in which a piston connected to a piston rod is displaceably guided. A flow channel is formed in the piston which can be changed in cross-section to generate different damping forces. An axially displaceable piston ring can be provided for this purpose, which reduces the cross-section of the flow channel when the piston moves in a first direction and increases it in an opposite second direction, so that damping forces of different magnitudes are generated when the piston moves in different directions. Due to the displaceable piston ring, however, the problem arises that an idle stroke occurs at the beginning of a damping movement of the piston rod, since the piston ring must first be moved relative to the piston in order to reduce the flow channel. Such an idle stroke reduces the effective useful length of the damping stroke, which is disadvantageous especially for short damping paths. The piston ring can also be replaced by an elastic plate which can bend away from the piston when the piston moves against the damping direction to increase the cross-section of the flow channel. However, the use of such bendable plates has the disadvantage that they wear out quickly and the restoring forces are reduced, so that the flow channel is only insufficiently narrowed at the beginning of the stroke movement.

SUMMARY OF THE INVENTION

It is therefore the object of the present invention to create a damper for fittings for furniture or household appliances that reduces the idle stroke and has a long service life.

This object is solved by a damper with the features of claim 1.

In the damper according to the invention, the cross-section of at least one flow channel for generating high damping forces or low damping forces can be varied by means of a throttle element which is movable and pretensioned into the damping position by at least one spring element. This allows the idle stroke to be reduced, as the throttle element is moved back to a damping position where the cross-section of the at least one flow channel is small after a return movement of the damper and pressure has been equalized between the two chambers. If a movement of the piston rod relative to the housing is now initiated, a different pressure can build up in the two chambers after only a minimal stroke, leading to a flow through the at least one flow channel and the high damping forces.

The throttle element and at least one spring element are preferably made of different materials. The at least one spring element is preferably bendable and, for example, made of an elastic plastic, wherein metallic materials can also be used with a correspondingly thin wall thickness. The throttle element is preferably formed in a rigid manner and has a high surface hardness on at least one contact surface facing the flow channel, so that wear is kept to a minimum. The throttle element is preferably made of a harder material than the flexible spring element.

In a further embodiment, the throttle element is fixed in a clamping manner between a holder and the spring element. Thus the throttle element is also fixed in a damping position by the spring element, and only after overcoming the spring forces of the spring element can the throttle element be lifted from the holder. During a return movement of the piston, a certain pressure difference between the two chambers is required to enable the throttle element to lift off from the holder.

The throttle element is preferably designed as a piston ring. It is also possible to use other throttle elements, such as discs or ring segments, wherein the piston ring can easily be guided with positional accuracy in the housing. An outer side of the piston ring can be guided on an inner side of the pot-shaped housing.

In a further embodiment, a fixing element fixed to the piston rod is provided, which has an integrally designed spring element by means of which the piston ring or the throttle element is pretensioned into a holder connected to the piston rod. This allows the pretension of the throttle element or the piston ring to be carried out with only a few components, namely a holder connected to the piston rod, which can also be formed integrally with the piston rod, and a fixing element on which the spring element is integrally formed. This means that the unit of piston and piston rod can be manufactured from only three parts. The fixing element may, for example, have a pin which is fixed in a sleeve-shaped piston rod, in particular by clamping forces.

The piston is preferably pretensioned by a spring to a position with the piston rod extended. The damper is then designed as a pressure damper which provides high damping forces when the piston rod is pushed into the housing and a return occurs by the spring which pushes the piston rod out of the housing.

The housing may be designed in a pot-shaped manner and may have a seal at an area adjacent an opening which has an opening for the piston rod to pass through. The seal is preferably displaceably mounted on the housing for volume compensation by inserting or withdrawing the piston rod. Optionally, the seal may be retained within the housing by a cover, wherein the cover may have an outer part secured to the housing and an inner part secured to the seal, wherein the outer part is connected to the inner part by at least one spring arm so that the seal is retained by the cover and optionally may also be pretensioned towards the interior space of the housing.

At least one step, preferably two steps, each forming a cylindrical section with a different diameter, can be provided on the side opposite a base on the pot-shaped housing for exact positioning of the seal and/or cover. The diameter can increase towards the opening of the housing so that the seal and cover can be easily fitted.

The damper is preferably designed in a particularly compact way and the maximum stroke of the piston rod is preferably less than 6 mm, in particular between 3 mm and 5 mm. The total length of the damper may be less than 20 mm, in particular less than 18 mm with the piston rod extended.

The throttle element is preferably designed as a piston ring, which has a flow channel with a first radially inner orifice and a second radially outer orifice. The two orifices can be arranged at a predetermined angular distance from each other, for example between 90° and 270°, so that the flow channel extends not only radially but also essentially parallel to the circumference. At at least one orifice a step can be formed, in particular an annular step, which is formed as a recess. This prevents the flow conditions from being affected when a holder covers an orifice region area. The orifice region is thus located in the recess or step, so that overlapping of the flow channel in the orifice region has little or no effect on the damping properties. An eccentric arrangement of a holding element connected to the piston relative to the throttle element therefore does not change the damping properties.

According to the invention, a fitting of a piece of furniture or a household appliance is also provided with such a damper, for example a hinge in which the damper is used to dampen a closing and/or opening movement.

BRIEF DESCRIPTION OF THE DRAWING FIGURES

Figure 5A:
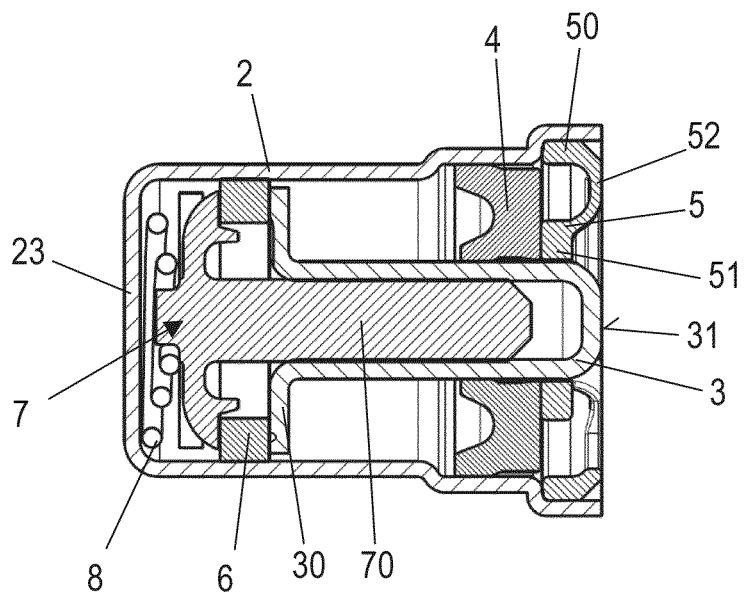
Figure 5B:
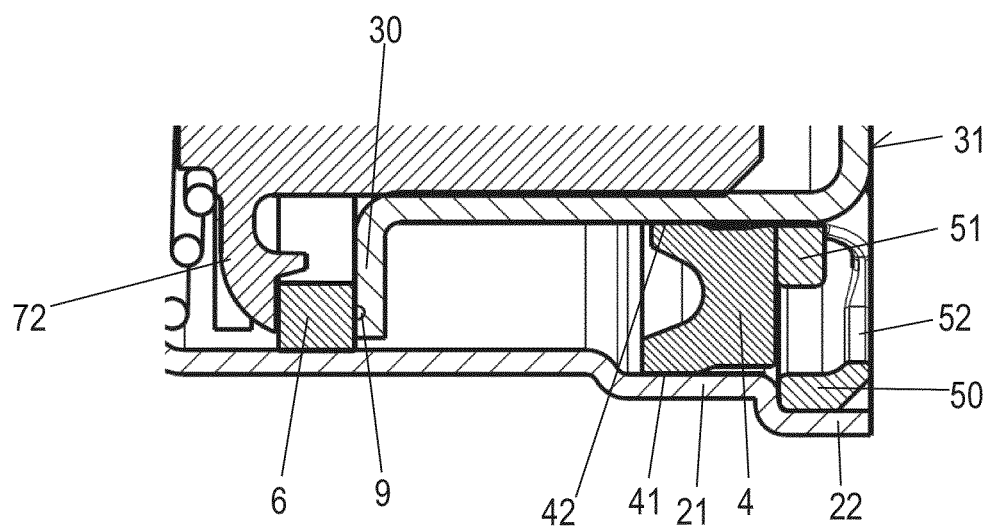
Figure 6A:
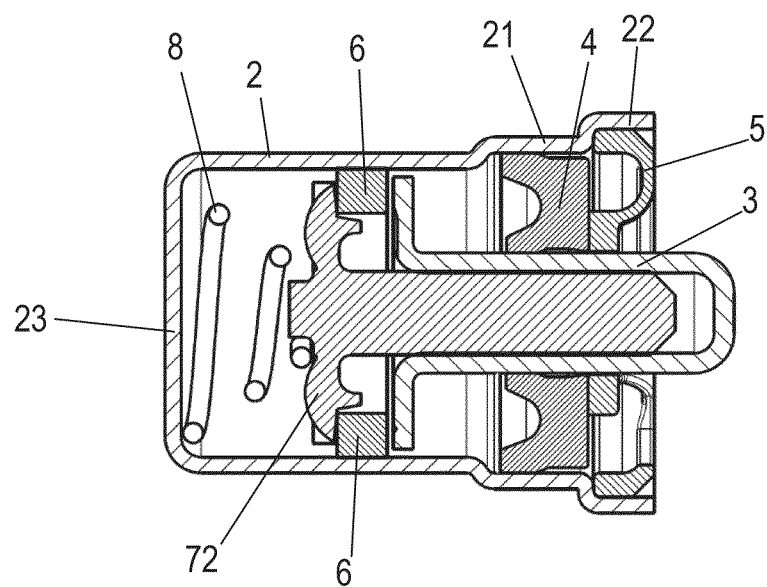
Figure 6B:
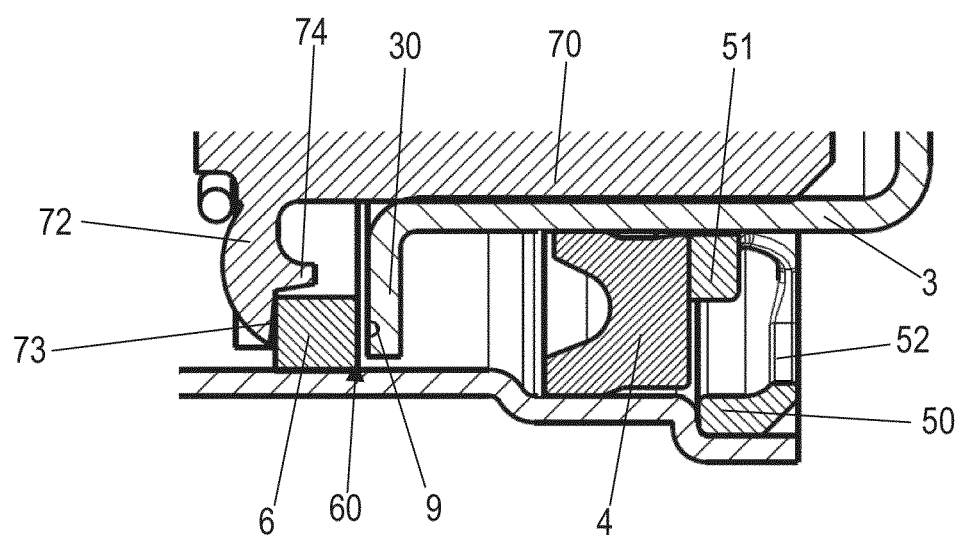
Figure 7A:
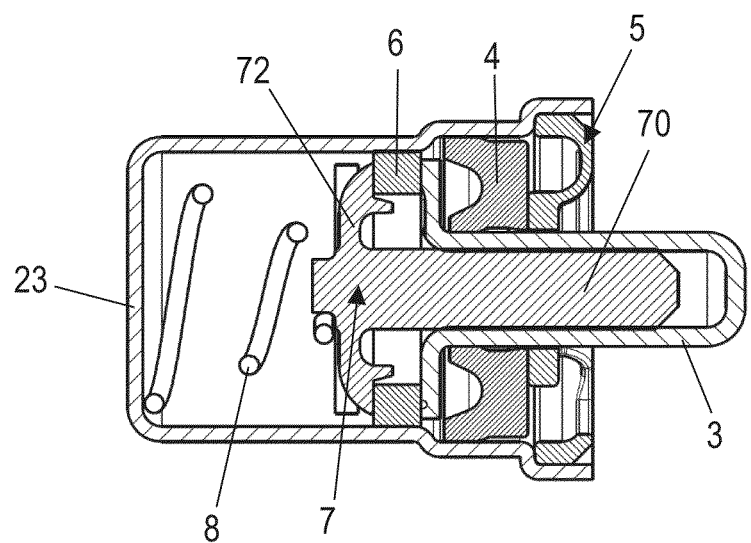
Figure 7B:
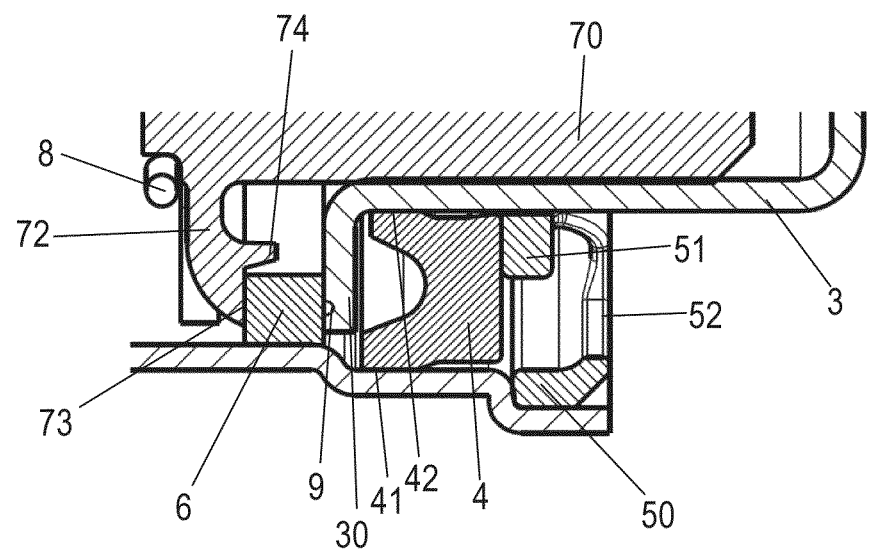
Figure 8A:
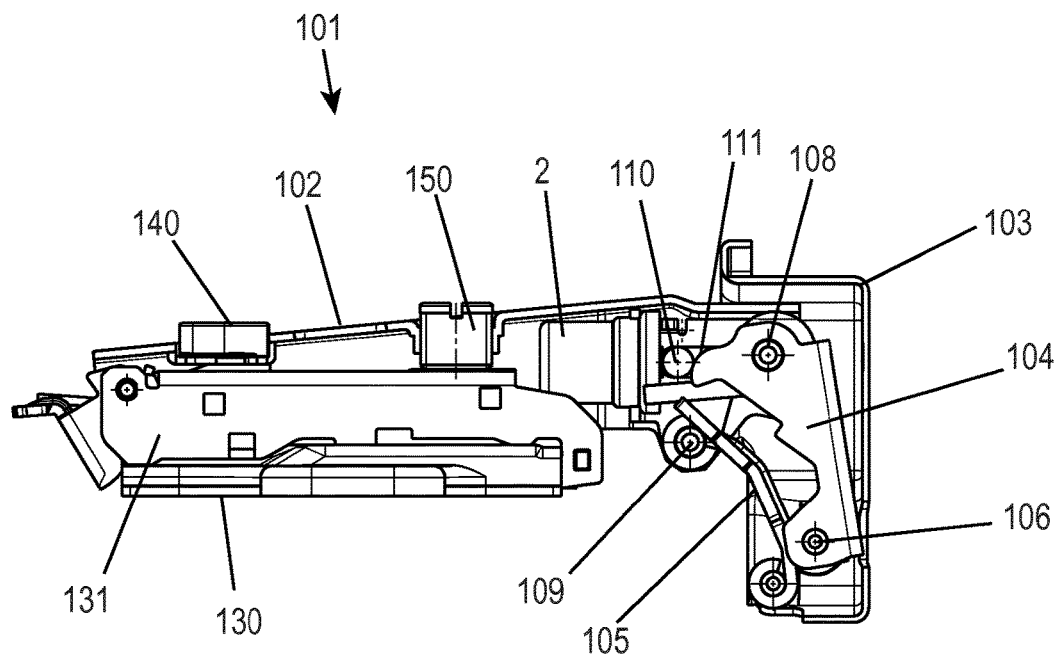
Figure 8B:
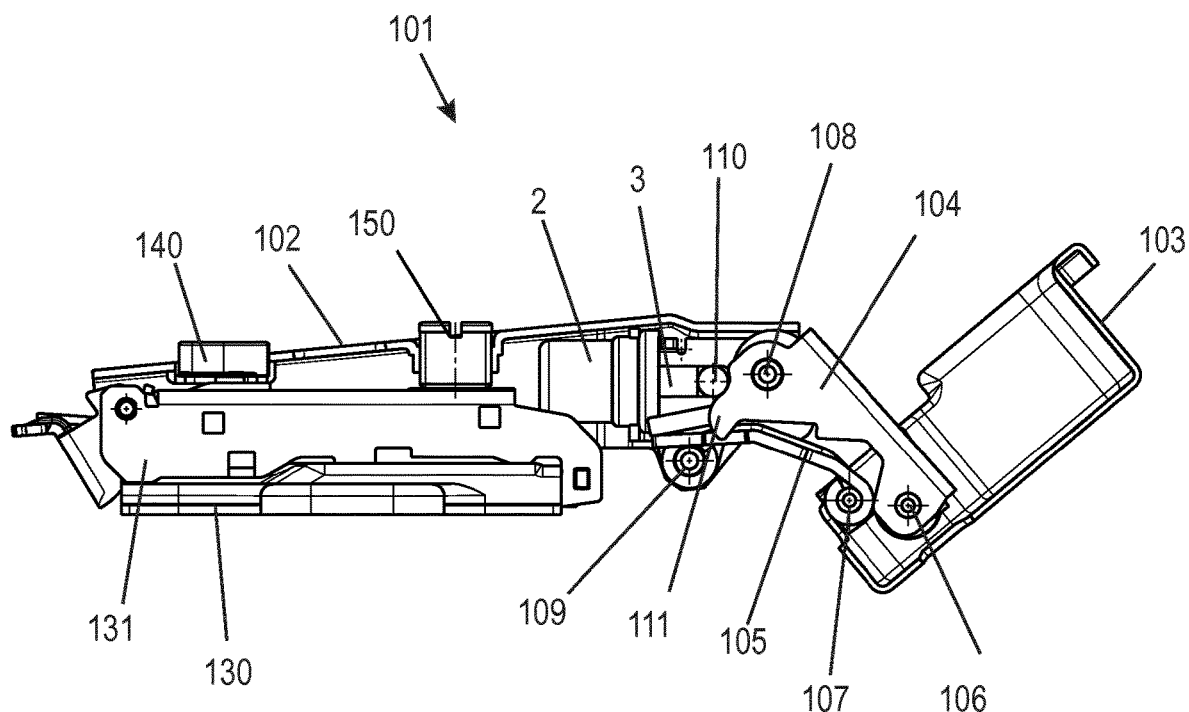
Figure 9A:
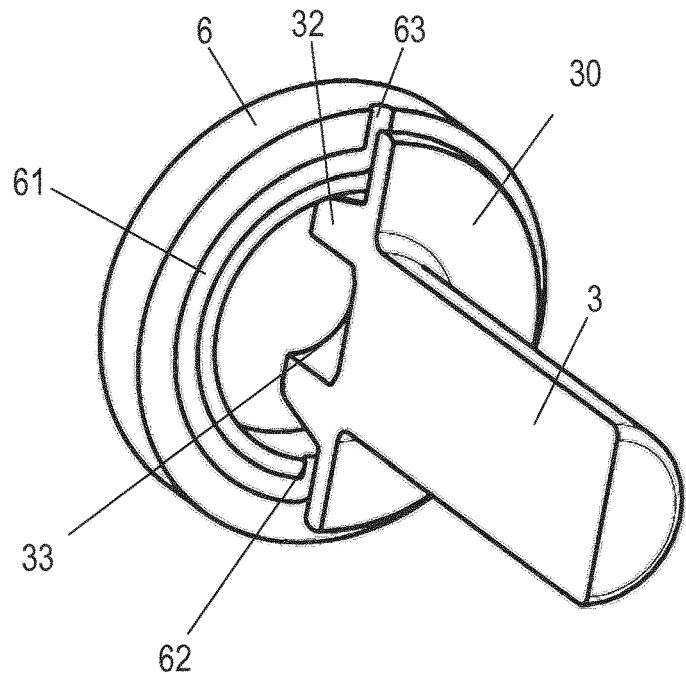
Figure 9B:
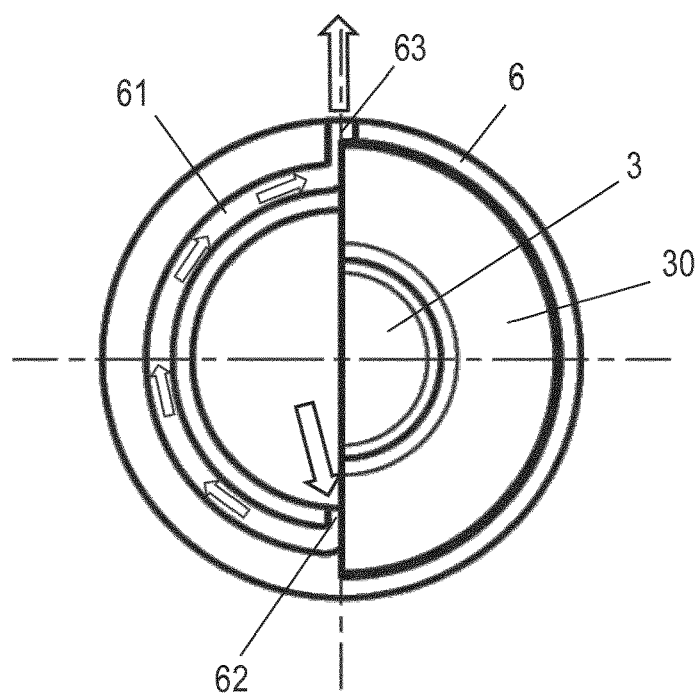
Figure 10A:
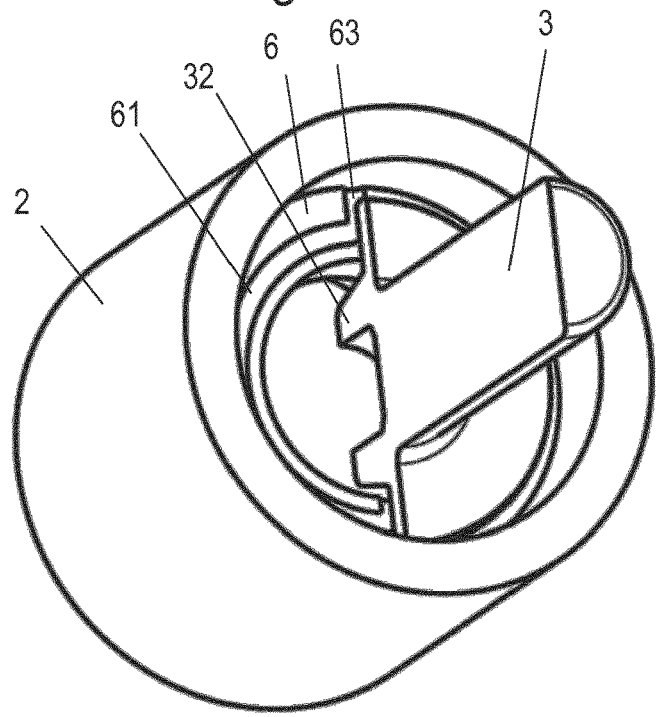
Figure 10B:
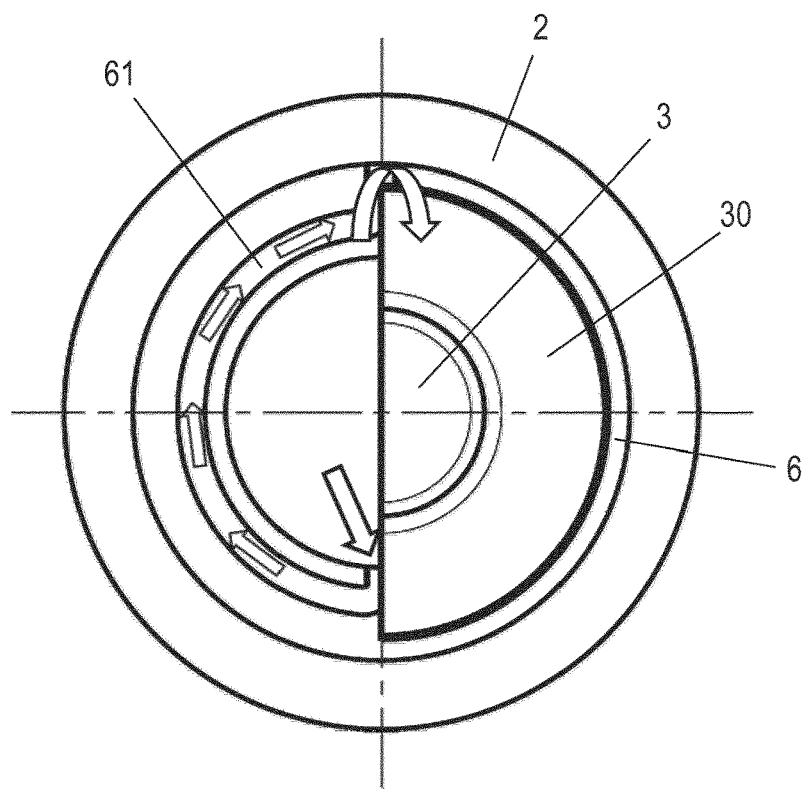
Figure 12C:
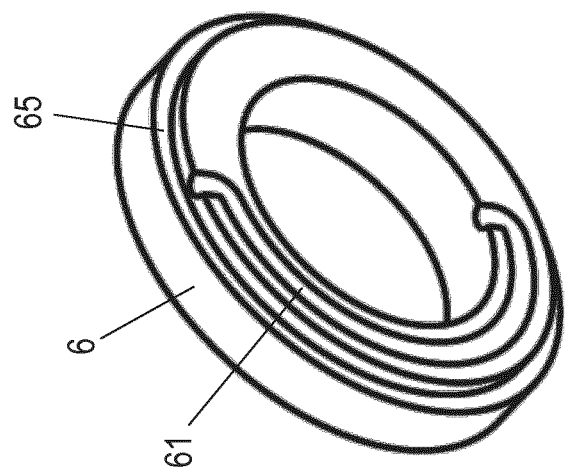
Figure 12B:
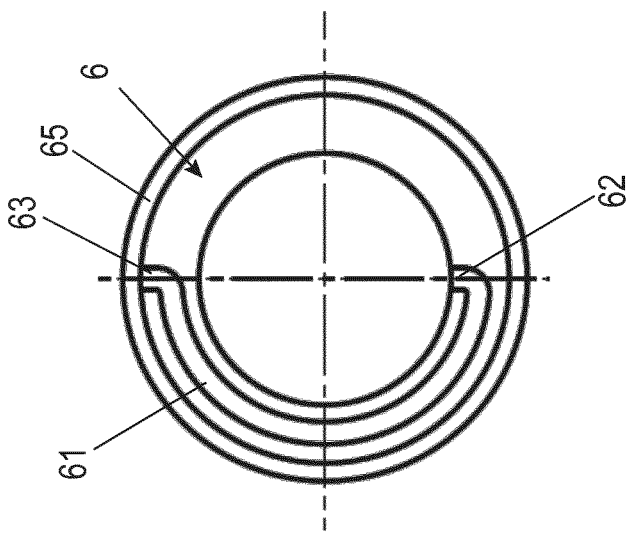
Figure 12A:
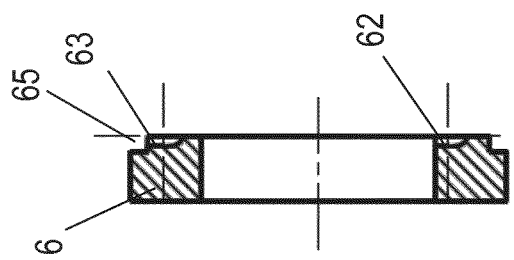
Figure 13:
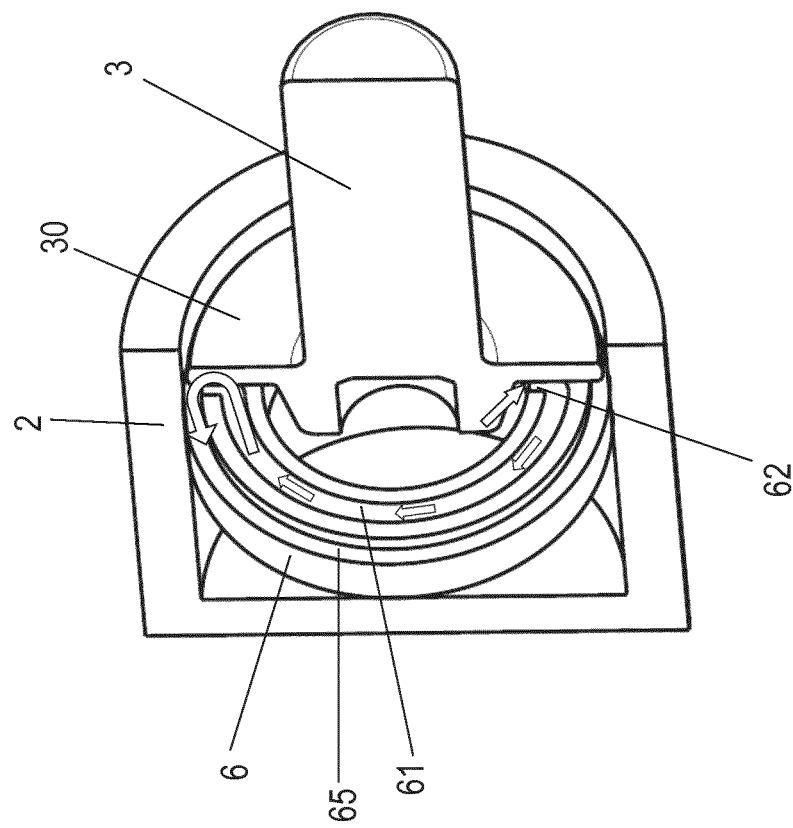
Figure 14:
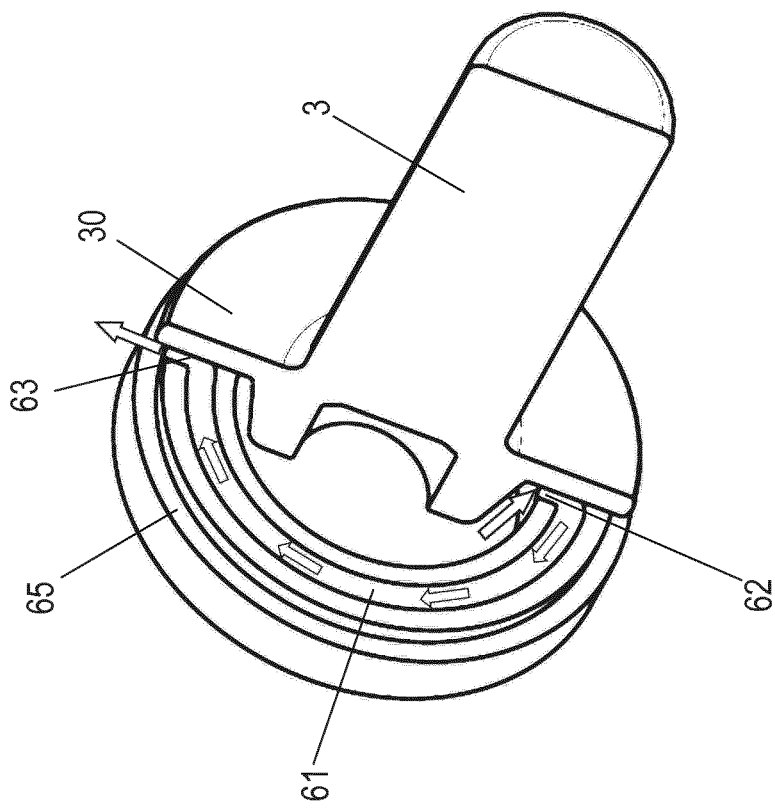

FIGS. 5A and 5B two views of the damper with inserted piston rod;

FIGS. 6A and 6B show two views of the damper when extending the piston rod;

FIGS. 7A and 7B show two views of the damper with extended piston rod;

FIGS. 8A and 8B show two views of a hinge with a damper according to the invention;

FIGS. 9A and 9B show two views of a piston ring with a modified flow channel;

FIGS. 10A and 10B show two schematic views of the throttle element of FIG. 9 inside the housing;

FIGS. 11A to 11C show several views of the throttle element of FIG. 10 with different positions of the holder;

FIGS. 12A and 12C show multiple views of a modified throttle element;

FIG. 13 shows a view of the throttle element of FIG. 12 together with the holding element, and FIG. 14 shows a view of the throttle element of FIG. 12 in a schematically depicted built-in situation.

DETAILED DESCRIPTION OF THE EMBODIMENTS

A damper 1 is designed as a linear damper and comprises a pot-shaped housing 2 on which a piston rod 3 is linearly displaceable. The piston rod 3 is connected to a piston in the interior space and passed at an opening in the housing 2 through a cover 5, which has an annular outer part 50 fixed to the housing 2 and an inner part 51. The inner part 51 holds a seal 4 in the housing 2, wherein the seal 4 can be displaced in the longitudinal direction of the piston rod 3 and the inner part 51 can be moved relative to the outer part 50 via spring arms 52.

Figure 1:
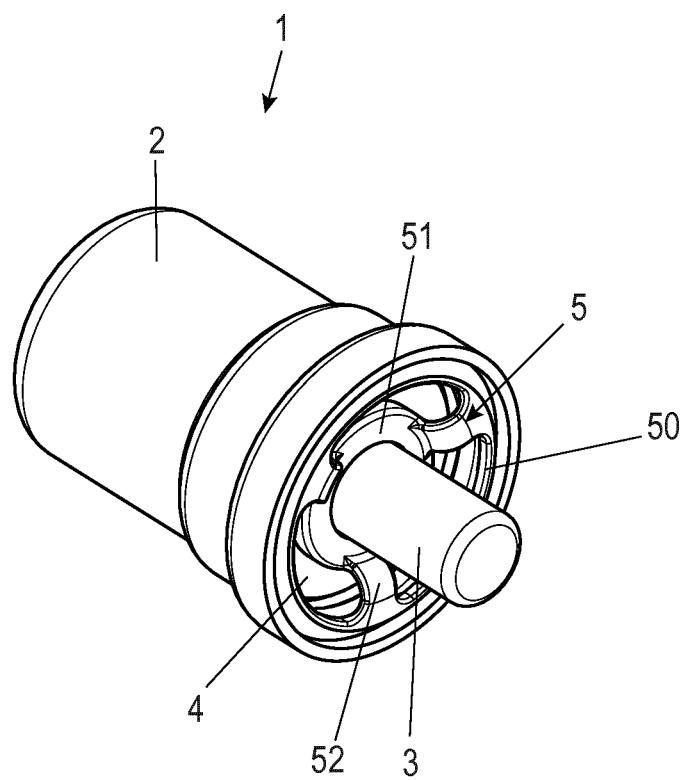
FIG. 1 shows a perspective view of a damper according to the invention.
Figure 2:
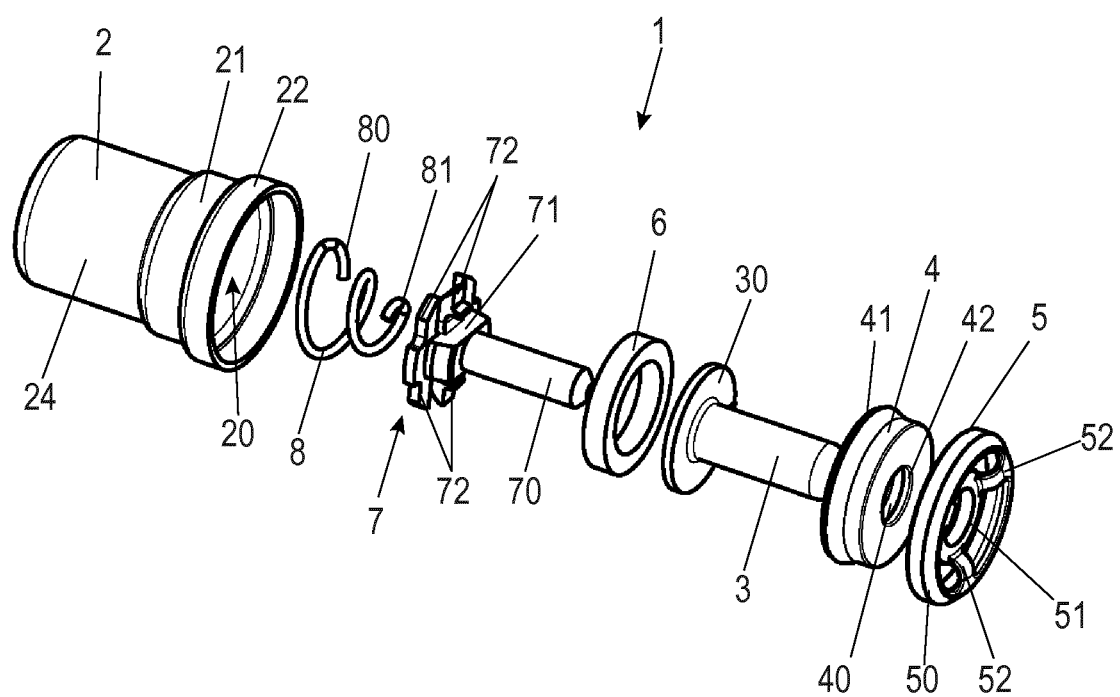
FIG. 2 shows a perspective exploded view of the damper of FIG. 1.

In FIG. 2 the damper 1 is shown in an exploded view. It can be seen that the piston rod 3 is passed through an inner opening 40 on a seal 4, wherein the seal 4 has an outer sealing lip 41 or a sealing bead and an inner sealing lip 42 or a sealing bead.

The piston rod 3 is formed integrally with or connected to a disc-shaped holder 30 on which a throttle element 6 in the form of a piston ring is held. The throttle element 6 is arranged between a section of a fixing element 7 and the holder 30.

The fixing element 7 comprises a pin 70 which is inserted into the sleeve-shaped piston rod 3 and fixed there, in particular by clamping forces, via bonding or other fastening means. The fixing element comprises a base 71 connected to the pin 70, on which spring elements 72 protrude, which serve for the elastic mounting of the throttle element 6.

In addition, a spring 8 is provided which is supported by a first end 80 on a base of the pot-shaped housing 2 and which pretensions the fixing element 7 and thus the piston rod 3 into an extended position by an opposite end 81. The spring 8 is spiral-shaped with a continuously different winding diameter, so that it can be pressed flat against a base of housing 2 when compressed.

Figure 3A:
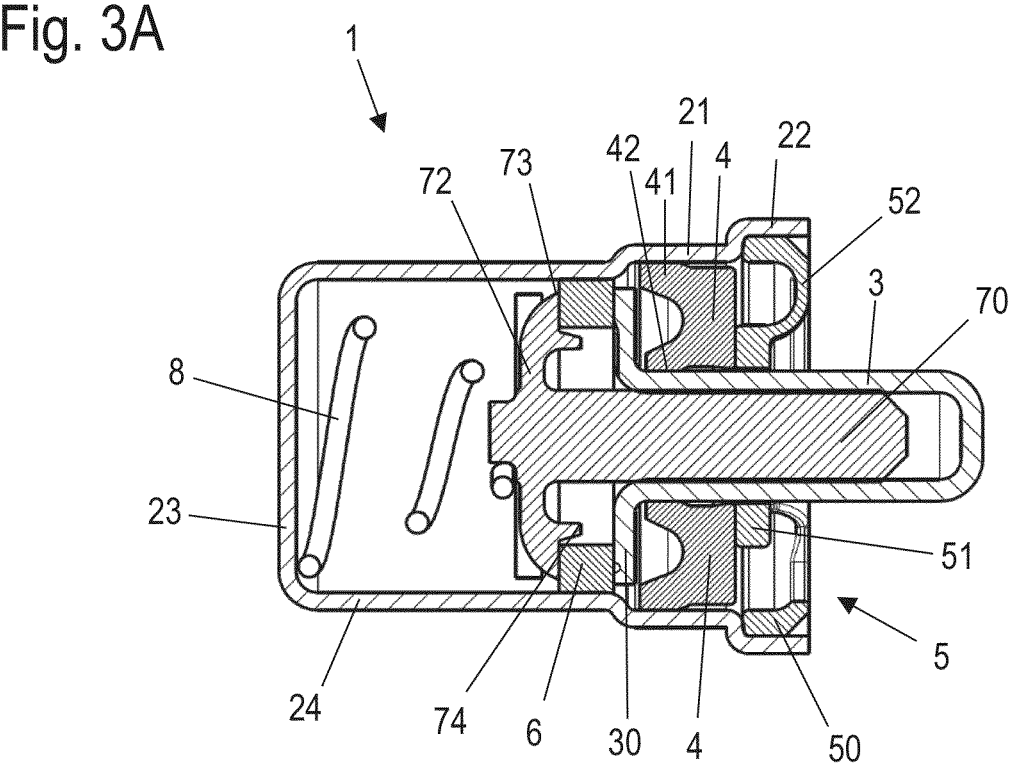
FIGS. 3A and 3B show two views of the damper in a starting position.
Figure 3B:
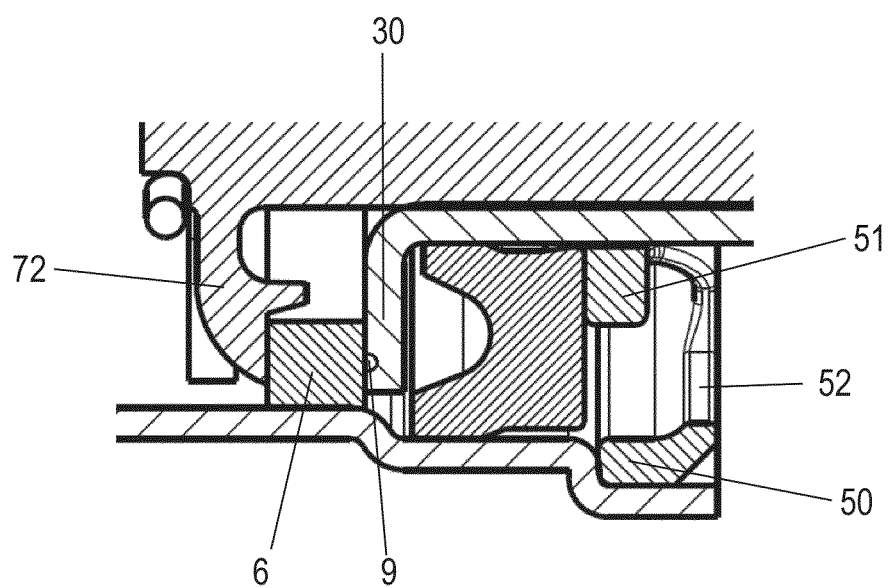

In FIGS. 3A and 3B the damper 1 is shown in a starting position with the piston rod 3 extended. It can be seen that the housing 2 has a base 23 on which the spring 8 is supported. A first cylindrical section 24, on which the piston of the damper 1 is linearly guided, adjoins the base 23. The piston comprises the throttle element 6, the holder 30 and the fixing element 7, which is movable as a unit. A plurality of spring elements 72 are integrally formed on the fixing element 7, which rest with a contact surface 73 on the throttle element 6 and pretension it against the holder 30.

A first step 21 with a cylindrical section larger in diameter than the section 24 in which the seal 4 is received is formed on the housing 2. The seal 4 rests with the outer sealing lip 41 on the cylindrical section of step 21 and with an inner sealing lip 42 on the outer circumference of the piston rod 3.

A second step 22, having a cylindrical section with a slightly larger diameter than the first step 21, is formed on the housing 2 adjacent to the first step 21. The cover 5 is fixed to the second step 22, wherein the annular outer part 50 is fixed to the transition between the first step 21 and the second step 22 and is connected to the annular inner part 51 via spring arms 52. Thus the seal 4 is held over the inner part 51 and optionally also pretensioned towards the interior space of the housing 2.

FIG. 3B shows the area of the throttle element 6 in detail. The piston at the damper 1 divides the interior space 20 of the housing into two chambers, which are arranged in the figures right and left of a flow channel 9 at the piston. The flow channel 9 is formed by a groove on the holder 30 and connects a chamber on the right side of the holder 30 with a chamber on the left side of the holder 30. The flow channel 9 has a small cross-section which is at least partially covered by the throttle element 6. The throttle element 6 is pretensioned towards the holder 30 by one or more spring elements 72 and at least partially covers the flow channel 9. It is of course possible to provide several flow channels 9 on the holder 30 or to form the flow channel on the throttle element 6 and to provide the holder 30 flat or with further flow channels. In any case, the at least one flow channel 9 forms a flowable cross-section between the two chambers, wherein a small cross-section of the flow channel 9 ensures high damping forces when moving the piston rod 3 relative to the housing 2. A liquid such as oil, in particular silicone oil, is preferably provided as damping fluid in housing 2, wherein other liquids or gases can also be used.

Figure 4A:
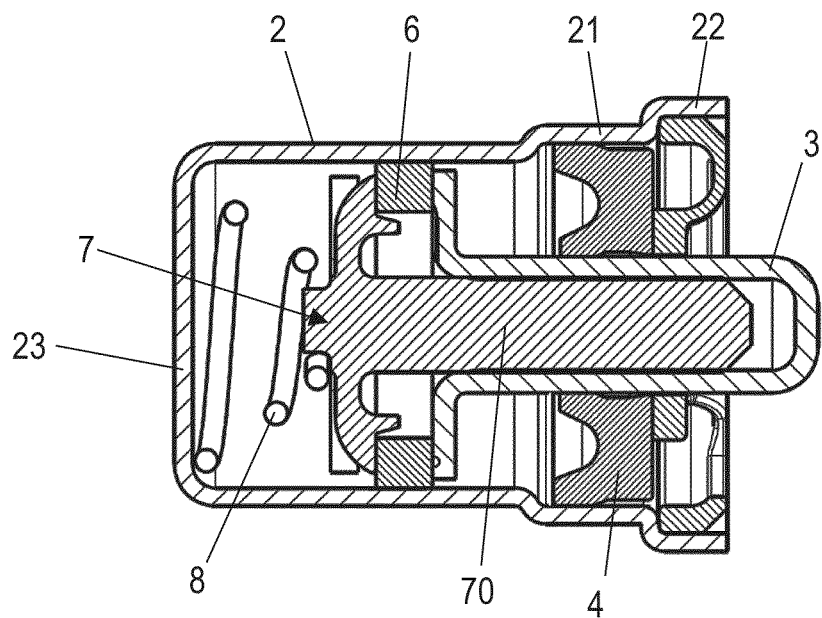
FIGS. 4A and 4B show two views of the damper when inserting the piston rod.
Figure 4B:
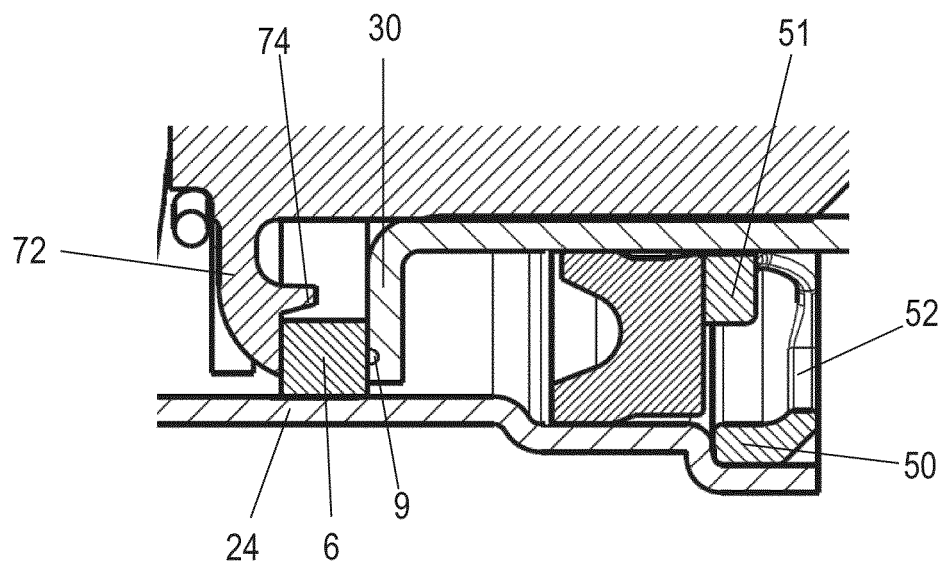

If a movement is to be damped, for example a movement of a fitting such as a hinge or an pull-out guide, the piston rod 3 is pushed into the pot-shaped housing 2, as shown in FIGS. 4A and 4B. By pushing in the piston rod 3, the throttle element 6 is further pressed against the holder 30, and the damping fluid flows through the flow channel 9 to pass from the left side to the right side of the piston in FIG. 4A. The throttle element 6 is guided on an inner circumference of the cylindrical section 24. By inserting the piston rod 3 into the housing 2, a certain volume is displaced for the damping fluid, which is compensated in that the seal 4 is displaced slightly towards the opening of the housing 2. The seal 4 presses against the inner part 51, which is moved relative to the outer part 50 against the force of the spring arms 52.

In FIGS. 5A and 5B, the piston rod 3 is shown in the fully retracted position and a surface 31 on an end face of the piston rod 3 is arranged substantially on a plane with an opening of the housing 2. The seal 4 was moved a little further to the opening of the housing 2, whereby the inner part 51 was moved against the force of the spring arms 52. The springs 8 now lie flat on the base 23 of the housing 2, with the individual windings of the spring 8 interlocking.

For a return movement, the piston rod 3 can now be moved back to an extended position, wherein the extension movement should occur in a smoother way, i.e. with lower damping forces than when the piston rod 3 is retracted. As shown in FIGS. 6A and 6B, an extension movement of the piston rod 3 again relaxes the spring 8, which pushes the fixing element 7 together with the piston rod 3 into the extended position. The flow channel 9 is enlarged in cross-section by slightly lifting the throttle element 6 from the flow channel 9 and the holder 30 so that a gap 60 is created. Through this gap 60, the damping fluid can now flow from the right-hand side of the holder 30 to the left-hand side when the piston rod 3 extends, so that the movement of the piston rod 3 is comparatively smooth-running, as the flow cross-section is increased. The creation of a gap 60 is made possible in such a way that the throttle element 6 is held resiliently by the spring element 72 and by a certain pressure difference between the two chambers, e.g. 0.1 bar, which causes the throttle element 6 to be lifted from the holder 30 against the force of the spring element 72. When the piston rod 3 is displaced, the spring element 72 no longer presses on the holder 30, but holds the throttle element 6 in such a way that it follows the holder 30, wherein essentially only frictional forces have to be overcome.

When the extension movement of the piston rod 3 is completed, as shown in FIGS. 7A and 7B, a pressure equalization takes place between the two chambers and the throttle element 6 is now pressed again against the holder 30 by the spring element 72, so that the flow channel 9 is reduced again in cross-section. When the piston rod 3 is extended, the volume for the damping fluid in the housing 2 is increased again, so that the seal 4 is pressed into the housing 2 by the inner part 51 due to the force of the spring arms 52. This allows seal 4 to move into housing 2 at step 21. FIGS. 7A and 7B therefore correspond to the starting position of FIGS. 3A and 3B.

In the embodiment example shown, a single flow channel 9 is recessed in the holder 30. The flow channel 9 can extend radially, helically or with other geometry and is closed at least over a section by the throttle element 6. It is of course possible to provide several flow channels 9 on the holder 30 and/or the throttle element 6. The throttle element 6 is held on the fixing element 7, wherein a projection 74 is formed on the spring element 72 to center the throttle element 6. It is also possible to fix the throttle element 6 to the spring arms 72 via fastening means or to glue it directly. The material of the throttle element 6 is preferably hard and can be coated on the side facing the flow channel 9.

In FIGS. 8A and 8B, the damper according to the invention is shown in a hinge 101. The hinge 101 comprises a side part 102, which is fixed to a mounting plate 130 via an intermediate piece 131. The side part 102 is held adjustable by a height adjustment 140 and a depth adjustment 150. In the side part 102 the housing 2 of the damper is fixed. A hinge part 103 is pivotably mounted on the side part 102, for which a first lever 104 and a second lever 105 are provided, which ensure a connection between side part 102 and hinge part 103 via four rotational axes 106, 107, 108 and 109. The lever 104 is equipped with a cam guide 111 which presses on a pin 110 to push the piston rod 3 into the housing 2 or to release the piston rod 3 so that it can be moved back into the extended position by the force of the spring 8. FIG. 8A shows the closed position of hinge 101 in which piston rod 3 is retracted, while FIG. 8B shows an opening position with piston rod 3 extended.

The damper 1 according to the invention can also be used in other fittings instead of a hinge 101, e.g. in seven-link hinges, pull-out guides, sliding doors or all other fittings where a compact damper is required. The damper 1 preferably has a maximum stroke of the piston rod 3 of less than 5 mm, in particular 3 to 4.5 mm, and the longitudinal extension of the damper 1 is preferably less than 20 mm, in particular less than 18 mm, so that the design is very compact.

FIGS. 9A and 9B show a part of a modified damper with a throttle element 6 that can be moved by a piston rod 3. The throttle element 6 is designed as a piston ring and has a flow channel 61 on the holder 30, which is designed as a ring or disc. The flow channel 61 is open in a groove-shaped or channel-shaped manner towards the holder 30. By contact of a surface of the throttle element 6 at the holder 30, the flow channel 61 is closed in the direction of the holder 30. The flow channel 61 has a first orifice 62 which extends in a radial direction and ends at an inner side of the throttle element 6, and a second orifice 63 which extends radially outwards and ends at an outer side of the throttle element 6. The orifices 62 and 63 are arranged in an angular offset relative to an axis of the piston rod 3, in particular between 90° and 270°, so that the predominant part of the flow channel 61 extends essentially parallel to an outer circumference of the throttle element 6. Other geometries of the flow channel are also possible, e.g. it can be meander-shaped, wave-shaped or recessed in straight sections along a surface of the throttle element 6.

The throttle element 6 is moved by the piston rod 3 which has a ring- or disc-shaped holder 30. Furthermore, a ring 32, which engages in the throttle element 6, is integrally formed with the piston rod 3. In the ring 32 there is a receptacle 33, into which a shortened pin 70 of a fixing element can engage.

When the damper is acted upon by a force from the piston rod 3 in the axial direction, the medium flows through the flow channel 61 as shown in FIG. 9B. The fluid in the damper then flows through the flow channel from the first orifice 62 to the second orifice 63.

In FIGS. 10A and 10B, the throttle element 6 of FIG. 9 is shown in a schematic representation in housing 2. The housing 2 is cylindrical in the area of the mounting for the throttle element 6 and guides the throttle element 6 in axial direction. This generates the damping forces required when moving the piston rod 3 relative to the housing.

FIGS. 11A to 11C show the damper of FIG. 10. In FIG. 11A, the holder 30 is arranged centrally and a substantially uniform gap is provided between the holder 30 and the housing 2 so that the damping fluid can flow out of the second orifice 63. In a loaded position, however, it is possible that the holder 30 is not arranged centrally and, for example, rests against a wall of housing 2, as shown in FIG. 11B. In this position the introduction of force through the piston rod 3 is eccentric, but the orifice 63 is not covered by the holder 30. It can happen, however, that according to FIG. 11C the holder 30 covers the orifice 63, so that the flow channel 61 is closed in the area of the orifice 63.

A misalignment of the holder 30 to the throttle element 6 is also possible, so that, not shown here, the inner orifice 62 of the flow channel 61 is partially or completely covered by the ring 32. This changes the damping forces, since the additional flow resistance at the orifice 62, 63 to the holder 30 or ring 32 requires increased forces to move the piston 3.

In order to reduce the influence of an off-center arrangement of the holder 30, the throttle element 6 of FIGS. 12A to 12C is equipped with a step 65 in the area of the orifice 63, which is designed as an angular recess extending over the entire circumference of the throttle element 6. It is obviously also possible to provide for step 65 only in one area of orifice 63 and not over the entire circumference. Thus, the orifice 63 is radially offset inwards, and the flow channel ends at the orifice 63 in the recess or step 65.

In order to eliminate the bottleneck at orifice 62, a step can also be formed here, which is designed as an angular recess that extends over the entire circumference of the throttle element 6. It is obviously also possible to provide for this step only in one area of orifice 62 and not over the entire circumference. Thus the orifice 62 is arranged radially offset to the outside, and the flow channel ends at the orifice 62 in the recess or step.

As shown in FIG. 13, the holder 30 can now cover the flow channel 61 in the area of orifice 63 without affecting the damping behavior, because the flow path of the damping fluid from the inner orifice 62 through the flow channel 61 to orifice 63 is independent of the position of the holder 30, and in the area of orifice 63 the damping fluid flows into step 65 and can be distributed there. Even if the holder 30 covers the orifice 63, as shown in FIG. 14, the fluid can now flow into step 65 and be distributed there in the area of the circumference of the throttle element 6.

LIST OF REFERENCE SIGNS

1 Damper
2 Housing
3 Piston rod
4 Seal
5 Cover
6 Throttle element
7 Fixing element
8 Spring
9 Flow channel
20 Interior space
21 Step
22 Step
23 Base
24 Section
30 Holder
31 Surface
32 Ring
33 Receptacle
40 Opening
41 Sealing lip
42 Sealing lip
50 Outer part
51 Inner part
52 Spring arm
60 Gap
61 Flow channel
62 Orifice
63 Orifice
35 Step
70 Pin
71 Base
72 Spring element
73 Contact surface
74 Projection
80 End
81 End
101 Hinge
102 Side part
103 Hinge part
104 Lever
105 Lever
106 Rotational axis
107 Rotational axis
108 Rotational axis
109 Rotational axis
110 Pin
111 Cam guide
130 Mounting plate
131 Intermediate piece
140 Height adjustment
150 Depth adjustment

What is claimed is:

1. A damper (1) for fittings for furniture or domestic appliances, comprising a housing (2) in which a piston which is connected to a piston rod (3) is guided in a linearly displaceable manner and divides an interior space (20) in the housing (2) into two chambers, wherein at least one flow channel (9) which connects the two chambers to one another is formed on or in the piston, wherein a throttle element (6) in the form of a piston ring is provided, which, in a damping position, reduces the cross-section of the at least one flow channel (9) when the piston moves in a first direction in order to generate increased damping forces, and when the piston moves in the second second direction opposite to the first direction, increases the cross-section of the at least one flow channel (9) for reducing the damping forces by a movement of the throttle element (6), wherein the throttle element (6) is pretensioned into the damping position by at least one spring element (72) and the piston (3) is pretensioned via a spring (8) into a position with extended piston rod (3), wherein the throttle element (6) is fixed in a clamping manner between a holder (30) connected to the piston rod (3) and the at least one spring element (72), wherein the at least one spring element (72) is integrally formed with a fixing element (7) fixed to the piston rod (3), and wherein the throttle element (6) is pretensioned by means of the at least one spring element (72) against the holder (30).

2. The damper according to claim 1, wherein the throttle element (6) and the at least one spring element (72) are made of different materials.

3. The damper according to claim 1, wherein the fixing element (7) is fixed with a pin (70) in the sleeve-shaped piston rod (3) and is held by clamping forces.

4. The damper according to claim 1, wherein the housing (2) is pot-shaped and has, at an area adjacent to an opening, a seal (4) which has an inner opening (40) for the piston rod (3) to pass through.

5. The damper according to claim 4, wherein the seal (4) is displaceably mounted on the housing (2) for volume compensation by the insertion or withdrawal of the piston rod (3).

6. The damper according to claim 4, wherein the seal (4) is held in the housing (2) via a cover (5).

7. The damper according to claim 6, wherein the cover (5) has an outer part (50) fixed to the housing (2) and an inner part (51) lying on the seal (4), wherein the outer part (50) is connected to the inner part (51) via at least one spring arm (52).

8. The damper according claim 1, wherein least one step (21, 22) for receiving a displaceable seal (4) and/or a cover (5) is provided on the pot-shaped housing (2) on the side opposite a base (23).

9. The damper according to claim 1, wherein the maximum stroke of the piston rod (3) is less than 6 mm.

10. The damper according to claim 1, wherein the throttle element (6) is provided a flow channel (61) having a first orifice (62) on an inside and a second orifice (63) on an outside as seen in a radial direction.

11. The damper according to claim 10, wherein a step (65) is provided as a recess at at least one orifice (62, 63).

12. A hinge, in particular for furniture or household appliances, having a damper (1) according to claim 1.

* * * * *